United States Patent
Tokarz et al.

(10) Patent No.: US 11,230,288 B1
(45) Date of Patent: Jan. 25, 2022

(54) OPTIMIZED REGENERATIVE BRAKING FOR HYBRID ELECTRIC VEHICLE (HEV) POWERTRAIN CONFIGURATIONS

(71) Applicant: GM GLOBAL TECHNOLOGY OPERATIONS LLC, Detroit, MI (US)

(72) Inventors: David S. Tokarz, Wixom, MI (US); Stefan M. Frick, West Bloomfield, MI (US); Joshua F. Pacheco, Berkley, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 17/034,508

(22) Filed: Sep. 28, 2020

(51) Int. Cl.
*B60W 20/40* (2016.01)
*B60W 30/18* (2012.01)
(Continued)

(52) U.S. Cl.
CPC ......... *B60W 30/18127* (2013.01); *B60K 6/48* (2013.01); *B60L 7/18* (2013.01); *B60W 10/02* (2013.01); *B60W 10/06* (2013.01); *B60W 10/08* (2013.01); *B60W 20/40* (2013.01); *B60W 20/50* (2013.01); *B60W 10/18* (2013.01); *B60W 20/15* (2016.01); *B60W 2510/0657* (2013.01);
(Continued)

(58) Field of Classification Search
CPC ........... B60W 30/18127; B60W 20/40; B60W 10/02; B60W 20/50; B60W 10/08; B60W 10/06; B60W 10/18; B60W 20/15; B60W 2710/021; B60W 2710/0644; B60W 2710/08; B60W 2530/16; B60W 2710/083; B60W 2720/106; B60W 2720/18; B60W 2710/0627; B60W 2510/0657; B60W 2710/065; B60W 2510/18; B60W 2710/1005; B60K 6/48; B60L 7/18

See application file for complete search history.

(56) References Cited

U.S. PATENT DOCUMENTS 2,990,508 A 6/1961 Thompson
4,297,627 A 10/1981 Schaefer
(Continued)

FOREIGN PATENT DOCUMENTS

CN 112193232 A * 1/2021 ............ B60W 10/06
KR 101558376 B1 * 10/2015 .......... B60W 30/184

*Primary Examiner* — Roger L Pang
(74) *Attorney, Agent, or Firm* — Quinn IP Law (57) ABSTRACT

Presented are hybrid electric vehicle (HEV) powertrains and control logic for optimized regenerative braking (regen), methods for making/using such systems, and HEVs with increased regen through reduced engine and transmission friction. A method of operating an HEV includes determining if an REV operating state or fault prevents engagement of a regen control operation and, if not, responsively determining if a torque request for the REV's powertrain is less than a road load on the HEV. The regen control operation is executed responsive to the torque request being less than the road load. The regen control operation includes the power transmission drivingly disconnecting the engine from the road wheels, and the engine operating at a target engine speed. A negative torque offset to maintain a vehicle deceleration rate after disconnecting the engine from the road wheels is calculated; the traction motor outputs a negative torque based on this negative torque offset.

20 Claims, 3 Drawing Sheets

(51) Int. Cl.
    *B60W 10/08*     (2006.01)
    *B60W 10/06*     (2006.01)
    *B60W 20/50*     (2016.01)
    *B60K 6/48*     (2007.10)
    *B60L 7/18*     (2006.01)
    *B60W 10/02*     (2006.01)
    *B60W 10/18*     (2012.01)
    *B60W 20/15*     (2016.01)

(52) U.S. Cl.
    CPC ..... *B60W 2510/18* (2013.01); *B60W 2530/16* (2013.01); *B60W 2710/021* (2013.01); *B60W 2710/065* (2013.01); *B60W 2710/0627* (2013.01); *B60W 2710/0644* (2013.01); *B60W 2710/08* (2013.01); *B60W 2710/083* (2013.01); *B60W 2710/1005* (2013.01); *B60W 2710/18* (2013.01); *B60W 2720/106* (2013.01)

(56) References Cited

U.S. PATENT DOCUMENTS

| | | |
|---|---|---|
| 5,166,568 A | 11/1992 | Nystuen et al. |
| 5,331,239 A | 7/1994 | Kwun et al. |
| 6,163,127 A | 12/2000 | Patel et al. |
| 6,674,205 B2 | 1/2004 | Biais et al. |
| 7,969,058 B2 | 6/2011 | Rahman et al. |
| 8,313,307 B2 | 11/2012 | Nakagami et al. |
| 8,596,397 B2 | 12/2013 | Sakamoto |
| 8,684,257 B2 | 4/2014 | Osborne et al. |
| 8,928,197 B2 | 1/2015 | Jurkovic et al. |
| 8,929,097 B2 | 1/2015 | Nakasaka et al. |
| 8,933,606 B2 | 1/2015 | Rahman et al. |
| 9,452,682 B2 | 9/2016 | Triantos et al. |
| 9,637,127 B1 | 5/2017 | Cooper |
| 9,866,092 B2 | 1/2018 | Hanna et al. |
| 9,975,451 B2 | 5/2018 | Shepley et al. |
| 10,253,763 B2 | 4/2019 | Nakagami et al. |
| 2003/0094920 A1 | 5/2003 | Numaguchi et al. |
| 2003/0200761 A1 | 10/2003 | Funahashi et al. |
| 2006/0017345 A1 | 1/2006 | Uchida et al. |
| 2007/0216249 A1 | 9/2007 | Gruendel et al. |
| 2008/0205107 A1 | 8/2008 | Hattori et al. |
| 2009/0045688 A1 | 2/2009 | Liang et al. |
| 2010/0244610 A1 | 9/2010 | Hao et al. |
| 2011/0062902 A1 | 3/2011 | Patel et al. |
| 2011/0109180 A1 | 5/2011 | Akutsu et al. |
| 2011/0169363 A1 | 7/2011 | Summers et al. |
| 2011/0198962 A1 | 8/2011 | Tang |
| 2013/0049495 A1 | 2/2013 | Matsuo |
| 2013/0049516 A1 | 2/2013 | Kleber et al. |
| 2013/0049518 A1 | 2/2013 | Kleber et al. |
| 2013/0127291 A1 | 5/2013 | Agapiou et al. |
| 2013/0147303 A1 | 6/2013 | Kaiser et al. |
| 2013/0270952 A1 | 10/2013 | Jurkovic et al. |
| 2014/0202402 A1 | 7/2014 | Triantos et al. |
| 2014/0252903 A1 | 9/2014 | Rahman et al. |
| 2015/0333602 A1 | 11/2015 | Mohr |
| 2015/0336573 A1 | 11/2015 | Swales et al. |
| 2015/0372559 A1 | 12/2015 | Hattori et al. |
| 2016/0248302 A1 | 8/2016 | Nagao et al. |
| 2017/0224050 A1 | 8/2017 | Schouwenburg et al. |
| 2017/0294821 A1 | 10/2017 | Shimizu et al. |
| 2017/0361831 A1* | 12/2017 | Johri .................... B60W 20/50 |
| 2018/0215372 A1* | 8/2018 | Hosokawa ...... B60W 30/18127 |
| 2020/0083778 A1 | 3/2020 | Pack et al. |
| 2020/0164862 A1* | 5/2020 | Muta ............. B60W 30/18127 |
| 2021/0162979 A1* | 6/2021 | Ariyoshi ............... B60W 10/08 |

\* cited by examiner

OPTIMIZED REGENERATIVE BRAKING FOR HYBRID ELECTRIC VEHICLE (HEV) POWERTRAIN CONFIGURATIONS

INTRODUCTION

The present disclosure relates generally to hybrid-electric motor vehicles. More specifically, aspects of this disclosure relate to systems, methods, and devices for optimizing regenerative braking operations in P3/P4 hybrid powertrain configurations.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric ("electric-drive") vehicles, on the other hand, utilize alternative power sources to propel the vehicle and, thus, minimize or eliminate reliance on a fossil-fuel based engine for tractive power.

A full electric vehicle (FEV)—colloquially labeled an "electric car"—is a type of electric-drive vehicle configuration that altogether omits the internal combustion engine and attendant peripheral components from the powertrain system, relying on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

While innumerable options are available for propulsion of an HEV, there are three primary types of hybrid powertrain architectures used in modern vehicles: parallel hybrid, series hybrid, and series-parallel ("power-split") hybrid configurations. Series hybrid architectures—often referred to as a Range-Extended Electric Vehicle (REEV)—derive all tractive power from electric motors and, thus, eliminate any driving mechanical connection between the engine and final drive. In this case, the engine functions solely as a regenerative energy source, driving an electric generator that charges the vehicle's onboard traction battery pack. In contrast, the engine and motor/generator units in parallel hybrid architectures each has a driving mechanical connection to the power transmission and, thus, the vehicle's road wheels. As the name implies, series-parallel hybrid architectures combine features from both parallel hybrid and series hybrid powertrains. With gas-only, electric-only, and motor-assist operating modes, the motor and engine work independently or jointly—in parallel or in series—depending on the desired vehicle speed, overall vehicle power demand, and state-of-charge (SOC) of the battery.

SUMMARY

Presented herein are electrified powertrain systems with attendant control logic for optimized regenerative ("regen") braking, methods for making and methods for operating such systems, and hybrid electric vehicles with boosted regenerative braking through reduced engine and transmission friction. By way of example, disclosed systems and methods increase regenerative braking production through coordinated operation of an electric motor and internal combustion engine in P3/P4 hybrid powertrain configurations. In this example, P3/P4 HEV architectures employ an automatic transmission to disconnect the engine from the wheels while increasing utilization of the electric motor(s) during deceleration events to improve regenerative braking. The diminished engine and transmission-borne friction losses are converted via the traction motor and stored in the electric vehicle battery (EVB); this recovered energy is available for future use to offset expended fuel while maintaining desired deceleration rates.

For P3/P4 hybrid powertrain configurations where regenerative braking may operate independent of the engine and power transmission, the regen optimization algorithm may prompt the engine to disable deceleration fuel cut off (DECO) and the transmission to enter neutral, e.g., without a driver-commanded PRNDL shift. In this state, the engine and transmission produce less negative coasting torque, which may undesirably cause an occupant to perceive a reduction in deceleration rate as an acceleration or other disturbance. To offset this reduction in engine/transmission coasting torque, the traction motor is operable to supplement these losses by outputting additional negative axle torque to maintain a desired vehicle deceleration rate. While decoupled from the wheels, the engine is fueled to maintain an idle speed control. Additional electrical energy captured in this manner is greater than the fuel energy used to maintain engine idle speed, including round-trip electrical losses, and thus offsets any related fuel penalties.

Attendant benefits for at least some of the disclosed concepts include HEVs that utilize regenerative braking to recapture friction braking energy by converting internal friction energy of the engine and transmission into additional electrical energy. Initial test applications show marked improvements in regen braking performance for a selectable all-wheel drive (AWD) HEV powertrain with an engine assembly and multi-speed automatic power transmission on the primary axle and a motor-generator inverter unit (MGIU) on the secondary axle (e.g., approximately 7% to 12% fuel consumption reduction with a 10% or greater EPA City Cycle fuel economy benefit). While realized improvements were tested with respect to the foregoing HEV architecture, disclosed features are scalable to any electric-drive vehicle with an ICE/automatic transmission combination and an electric motor mechanically coupled on the transmission output (P3) or on a secondary axle (P4). In addition to increased regenerative braking throughput, disclosed concepts help to increase vehicle range, fuel economy, and performance.

Aspects of this disclosure are directed to electrified-powertrain control logic, closed-loop feedback regen control techniques, and computer-readable media (CRM) with optimized regenerative braking control for hybrid powertrains. In an example, a method is presented for operating an HEV.

This representative method includes, in any order and in any combination with any of the above and below disclosed options and features: determining, via a vehicle controller, if an operating state or fault of the HEV prevents engagement of a regenerative braking (regen) control operation; determining, via the vehicle controller responsive to the operating state/fault not preventing engagement of the regen control operation, if a torque request for the HEV's powertrain is less than a road load on the HEV; and executing the regen control operation responsive to the torque request being less than the road load. In this instance, the regen control operation includes: controlling the HEV's power transmission to drivingly disconnect the HEV's engine from its road wheels; controlling the engine to operate at a predefined target engine speed while disconnected from the road wheels; calculating a negative torque offset to maintain a predetermined vehicle deceleration rate after disconnecting the engine from the road wheels; and controlling the HEV's traction motor or motors to output a negative motor torque based on the calculated negative torque offset.

Additional aspects of this disclosure are directed to electrified powertrain systems and HEVs with optimized regenerative braking through minimized engine and transmission friction. As used herein, the terms "vehicle" and "motor vehicle" may be used interchangeably and synonymously to include any relevant vehicle platform, such as passenger vehicles (HEV, fuel cell, fully and partially autonomous, etc.), commercial vehicles, industrial vehicles, tracked vehicles, off-road and all-terrain vehicles (ATV), motorcycles, farm equipment, trains, etc. Disclosed features may be most effective for, but are certainly not limited to, P3 and P4 hybrid electric architectures (P3=E-machine on transmission output side; P4=E-machine direct connect to axle drive). In an example, an electric-drive vehicle includes a vehicle body with a passenger compartment, a first (rear) axle bearing a respective set of road wheels, a second (front) axle bearing a respective set of road wheels, and other standard original equipment. The HEV's powertrain includes an ICE assembly that outputs torque to a set of road wheels to propel the HEV, and one or more traction motors that output torque to a set of road wheels to propel the HEV. The HEV powertrain also includes a multi-speed power transmission that is operable to selectively drivingly connect and disconnect the ICE assembly to/from the road wheels.

Continuing with the discussion of the above example, the vehicle also includes a resident or remove vehicle controller that is operatively coupled to the HEV powertrain and is programmed to determine if an operating state or fault of the HEV prevents engagement of a regenerative braking control operation and, if not, determine if a torque request for the HEV powertrain is less than a road load on the HEV. Responsive to the torque request being less than the road load, the vehicle controller executes the regen control operation, including controlling the power transmission to drivingly disconnect the engine from the road wheels, controlling the engine to operate at a predefined target engine speed while disconnected from the road wheels, calculating a negative torque offset to maintain a preset vehicle deceleration rate after disconnecting the engine from the road wheels; and controlling the traction motor to output a negative motor torque based on the calculated negative torque offset.

For any of the disclosed systems, methods, and vehicles, the HEV's fuel system may be operable to fuel the engine and selectively execute deceleration fuel cutoff (DFCO) to temporarily suspend fuel flow to the engine during forward driving of the HEV. In this instance, the DFCO feature may be deactivated prior to drivingly disconnecting the engine from the road wheels. As yet a further option, the vehicle controller may determine if the traction motor is capable of generating the calculated negative torque offset prior to disconnecting the engine; if it is, the vehicle controller operates the traction motor to output the negative motor torque.

For any of the disclosed systems, methods, and vehicles, the vehicle controller may respond to a determination that the traction motor is not capable of generating at least the calculated negative torque offset by: determining a fuel energy penalty for operating the engine at the predefined target engine speed for the regen control operation; determining a maximum negative motor torque, less than the calculated negative torque offset, the traction motor is capable of generating; estimating a total electrical energy captured by the regen control operation with the output negative motor torque based on the maximum negative motor torque; determining if the total electrical energy is greater than the fuel energy penalty; and executing, in response to the estimated total electrical energy being greater than the fuel energy penalty, the regen control operation with the traction motor controlled to output the negative motor torque based on the maximum negative motor torque.

For any of the disclosed systems, methods, and vehicles, the vehicle controller may respond to a determination that the traction motor is capable of generating the calculated negative torque offset by: determining a fuel energy penalty for operating the engine at the predefined target engine speed for the regen control operation; estimating a total electrical energy captured by the regen control operation; and determining if the estimated total electrical energy captured by the regen control operation is greater than the fuel energy penalty, wherein executing the regen control operation is further in response to the estimated total electrical energy being greater than the fuel energy penalty. The controller may respond to the estimated total electrical energy not being greater than the fuel energy penalty by executing a default regen control operation without drivingly disconnecting the engine from the road wheels and without operating the engine at the predefined target engine speed.

For any of the disclosed systems, methods, and vehicles, the vehicle controller may be further programmed to: determine a total negative torque request associated with a deceleration event for the HEV powertrain to maintain the predetermined vehicle deceleration rate; and calculating a supplemental negative torque offset for the traction motor to maintain the predetermined vehicle deceleration rate based on the total negative torque request, wherein the negative motor torque output by the traction motor is further based on the calculated supplemental negative torque offset.

For any of the disclosed systems, methods, and vehicles, determining if the operating state or fault prevents engagement of the regen control operation includes any one or more or all of: receiving a driver-selected operating mode for the HEV that disengages the regen control operation; receiving a motor fault signal indicative of a motor fault of the traction motor that prevents engagement of the regen control operation; receiving a system fault signal indicative of a system fault in a high-voltage (HV) electrical system of the HEV that prevents engagement of the regen control operation; and/or receiving a powertrain fault signal indicative of a powertrain system fault that prevents the engine from operating at the predefined target engine speed and/or being disconnected from the road wheels.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
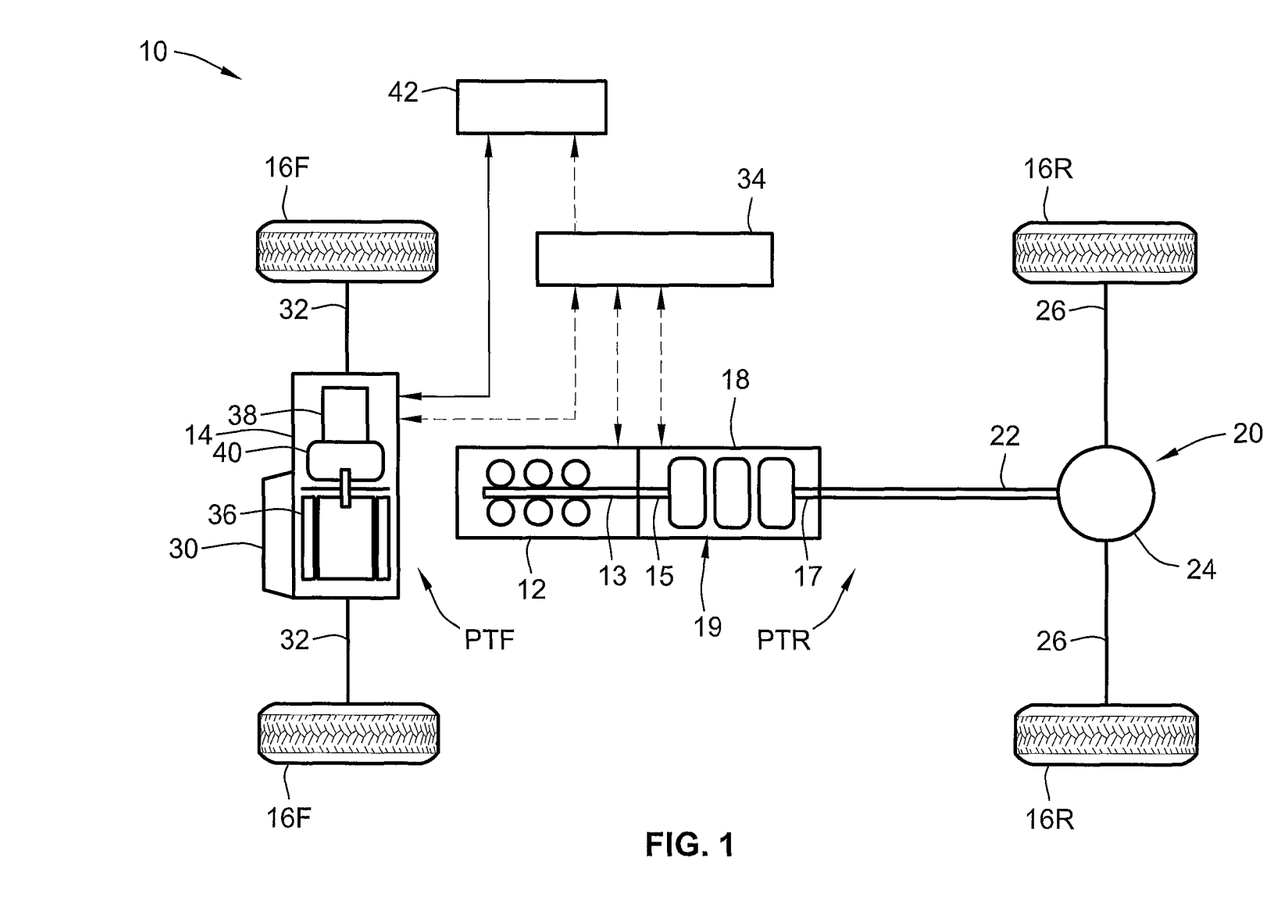
FIG. 1 is a schematic illustration of a representative electric-drive motor vehicle with a P4 hybrid powertrain providing improved regenerative braking through minimized engine and transmission friction losses according to aspects of the disclosed concepts.

Referring now to the drawings, wherein like reference numbers refer to like features throughout the several views, there is shown in FIG. 1 a schematic illustration of a representative automobile, which is designated generally at 10 and portrayed herein for purposes of discussion as a selectable all-wheel drive (AWD) passenger vehicle with a P4 hybrid-electric powertrain. The illustrated automobile 10—also referred to herein as "motor vehicle" or "vehicle" for short—is merely an exemplary application with which novel aspects of this disclosure can be practiced. In the same vein, implementation of the present concepts into a P4 hybrid powertrain architecture should also be appreciated as an exemplary application of the novel concepts disclosed herein. As such, it will be understood that features of the present disclosure may be applied to other powertrain configurations and utilized for any logically relevant type of motor vehicle. Lastly, only select components of an HEV have been shown and will be described in additional detail herein. Nevertheless, the vehicles and powertrains discussed below can include numerous additional and alternative features, and other available peripheral components, e.g., for carrying out the various methods and functions of this disclosure.

The AWD P4 HEV powertrain of automobile 10 is shown with a split-branch architecture: a rear (first or primary) powertrain P$_{TR}$ and a front (second and auxiliary) powertrain P$_{TF}$. Rear powertrain P$_{TR}$ is represented herein by a restartable internal combustion engine 12 that is drivingly connected to a backend final drive system 20 by a multi-speed automatic power transmission 18. The engine 12 transfers power, preferably by way of torque via an engine crankshaft 13 ("engine output member"), to an input side of the transmission 18. The transmission 18, in turn, is adapted to receive, selectively manipulate, and distribute tractive power from the engine 12 to the vehicle's final drive system 20 and thereby propel the vehicle 10. The rear final drive system 20 of FIG. 1 is generally composed of a drive shaft 22 that drivingly connects the power transmission 18 to a rear limited-slip differential 24; a pair of rear axle shafts (rear axle) 26 drivingly connect the differential 24 to a set of rear road wheels 16R.

The ICE assembly 12 operates to propel the vehicle 10 independently of an electric drive unit (EDU) assembly 14, e.g., in an "engine-only" operating mode, or in cooperation with the EDU assembly 14, e.g., in a "motor-boost" operating mode. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the vehicle's driveline system may take on any available configuration, including front wheel drive (FWD) layouts, rear wheel drive (RWD) layouts, four-wheel drive (4WD) layouts, six-by-four (6×4) layouts, etc.

Power transmission 18 may use differential gearing 19 to achieve selectively variable torque and speed ratios between the transmission's input shaft 15 ("transmission input member") and output shaft 17 ("transmission output member"), e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts. While envisioned as an 8-speed automatic transmission, the power transmission 18 may optionally take on other suitable configurations, including Continuously Variable Transmission (CVT) architectures, automated-manual transmissions, etc.

Front powertrain PTF of FIG. 1 is represented herein by an electric drive unit assembly 14 with an integrated power electronics (IPE) unit 30 that drives a set of front road wheels 16F through a respective pair of front axle shafts (front axle) 32. EDU assembly 14 may be generally typified by a solitary electric traction motor 36 having a single-speed reduction gearbox 38, e.g., with two gear reductions, and a transverse-split, bevel-type differential 40. Modulation of the EDU assembly 14 is controlled by an in-vehicle electronic control unit (ECU) 34 for delivering motive power to the ground-engaging road wheels 16F.

In accord with the powertrain architecture of FIG. 1, the front powertrain PTF delivers motive power to front road wheels 16F while the rear powertrain PTR delivers motive power to rear wheels 16R. However, alternative powertrain arrangements may employ the EDU assembly 14 to drive the rear wheels 16R, employ the EDU assembly 14 to drive the front and/or rear wheels 16F, 16R while altogether eliminating the ICE assembly 12, or employ the ICE assembly 12 and EDU assembly 14 to cooperatively drive the front wheels 16F, rear wheels 16R, or both.

With continuing reference to FIG. 1, the electric traction motor 36 may take on any motor configuration of suitable size and power to propel vehicle 10, including a polyphase permanent magnet (PM) synchronous motor/generator unit. Electric power is provided to the traction motor 36 through electrical conductors or cables that pass through a protective casing in suitable sealing and insulating feedthroughs (not illustrated). Conversely, electric power may be provided from the traction motor 36 to an onboard traction battery pack 42, e.g., through regenerative braking.

As indicated above, ECU 34 is constructed and programmed to govern, among other things, operation of the engine 12, drive unit 14, transmission 18, and traction battery pack 42. Control module, module, controller, control unit, electronic control unit, processor, and any permutations thereof, may be used interchangeably and synonymously to mean any one or various combinations of one or more of logic circuits, combinational logic circuit(s), Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. Associated memory and storage (e.g., read only, programmable read only, random access, hard drive, tangible, etc.)), whether resident, remote or a combination of both, store processor-executable software and/or firmware programs or routines.

Software, firmware, programs, instructions, routines, code, algorithms, and similar terms may be used interchangeably and synonymously to mean any processor-executable instruction sets, including calibrations and look-up tables. The ECU 34 may be designed with a set of control routines executed to provide desired functions. Control routines are executed, such as by a central processing unit, and are operable to monitor inputs from sensing devices and other networked control modules, and execute control and diagnostic routines to govern operation of devices and actuators. Such inputs may include vehicle speed and acceleration data, speed limit data, traffic light status and location data, road gradient data, stop sign location data, traffic flow data, geospatial data, road and lane-level data, vehicle dynamics data, sensor data, etc. Routines may be executed in real-time, continuously, systematically, sporadically and/or at regular intervals, for example, each 100 microseconds, 3.125, 6.25, 12.5, 25 and 100 milliseconds, etc., during vehicle use. Alternatively, routines may be executed in response to occurrence of an event during operation of the vehicle 10.

HEV 10 of FIG. 1 may utilize various regenerative energy recovery techniques to recapture kinetic energy of the moving vehicle that would otherwise be lost to friction. In addition to recovering translational momentum that would be lost as heat to friction-type braking, disclosed regenerative braking control operations also convert rotational energy of the engine and transmission, which is normally lost as internal friction, to surplus electrical energy. The HEV powertrain architecture of FIG. 1 allows regenerative braking to operate independent of the engine; as such, disclosed regen optimization algorithms may disengage the engine and concurrently operate the engine at a desired target speed/speed profile. This may necessitate temporary deactivation of DFCO, despite any associated fuel penalty. At the same time, the traction motor may operate to supplement negative braking torque lost from the now-disconnected engine by generating additional negative axle torque to maintain a corresponding deceleration rate for the associated braking/coasting event. The additional energy captured through this regen control operation is greater than the energy required to offset the aforesaid fuel penalty, e.g., when the ICE is close to its brake-specific fuel consumption (BSFC) minimum during high load operation.

In carrying out disclosed regen control methodologies, a resident powertrain control module (PCM) may issue a command prompt for the transmission to operatively disconnect the engine from the vehicle wheels and concomitantly enter a non-driver commanded neutral state. An engine control module (ECM) continues to fuel the engine in order to maintain engine speed, e.g., at or near idle. A power inverter module (PIM), through cooperative operation with the PCM and a battery control module (BCM), ensures the traction motor stays engaged with the road wheels, e.g., for regenerative braking and to selectively output any requisite supplemental braking torque. If motor-generated braking torque alone is insufficient, the HEV's blended braking system—generator-implemented MGU combined with frictional brake system—allocates this negative torque delta to the friction brakes, e.g., via available electronic brake control module (EBCM) in conjunction with BCM-PIM controls and CAN communication. Through the foregoing techniques, total recaptured energy includes both recaptured energy otherwise lost to braking friction and recaptured energy otherwise lost to engine/transmission friction. While described features may fuel the engine during deceleration events, with a resultant fuel penalty, the additional recaptured electrical energy increases fuel savings and improves HEV drivability that has been proven to reduce round-trip drive cycle fuel usage (e.g., by at least 10-12%).

Electric-drive vehicles using disclosed regen control protocols may command the ICE assembly to operate at a static or a dynamic engine speed. For static engine operation, the ICE assembly operates at or near idle speed, i.e., the engine speed that the ICE assembly defaults to upon a driver-commanded shift of the transmission into neutral. The ICE assembly remains fueled to achieve idle speed operation while disconnected from the vehicle's road wheels; this option yields better fuel efficiency gains by operating with lower fuel usage versus dynamic engine speed operation. For dynamic engine operation, the ICE assembly follows an actively changing speed profile, such as matching to a predefined engine speed curve or implementing motor turbine tracking. A benefit of this approach is the ability to speed-match the engine's real-time speed to the HEV's wheel speed and, thus, allow for immediate transmission of engine torque to the wheels responsive to a driver's tip-in command. Dynamic engine operation also allows the driver's engine RPM experience to match occupant-expected deceleration engine speed profiles, making this approach more seamless to a driver.

As noted above, the multi-speed power transmission may be commanded to enter a neutral state during regen operation. This neutral state can be the same as, or a different neutral operating mode, than is implemented when the driver requests neutral through a PRNDL (park-reverse-neutral-drive-low) neutral shift command. It is desirable, for at least some preferred applications, that this neutral state be engaged without driver input to ensure regenerative braking operates seamlessly to the vehicle occupants. For HEV powertrain configurations with an engine coupled to a hybrid transmission/drive unit (e.g., EDU assembly 14 of FIG. 1), the MGU(s) and clutches may be cooperatively actuated in a manner that allows the engine output to be disengaged from the wheels to enter a non-driver-commanded neutral state. In electrified powertrain applications employing a manual transmission with an electronically actuated clutch, the clutch is controlled to disconnect the ICE assembly from the wheels via a non-driver commanded request. It should be appreciated that the disclosed features are not per se limited to a particular type of engine or motor or transmission; rather, disclosed regen control operations may be implemented by any logically relevant type of powertrain configuration, both automotive and non-automotive alike.

Driver commands, such as accelerator pedal and brake pedal inputs, may be combined with disclosed regen features, for example, when the HEV is decelerating or a desired powertrain torque is below road load. The terms "deceleration" or "braking", as used herein, may be defined to include any applicable driving event in which a driver-requested or controller-requested powertrain torque is below road load, e.g., off-throttle coasting, brake-applied deceleration, downhill sailing or tip-out, etc. By way of non-limiting example, disclosed techniques may be implemented when One Pedal Driving (OPD) is engaged and utilizes a driver torque request vs pedal input curve that is different when OPD is disengaged. Disclosed regen techniques may also be used with autonomous driving features and advanced driver-assistance systems (ADASs), such as adaptive cruise control (ACC), Super Cruise, or "pure" autonomous driving.

Figure 2:
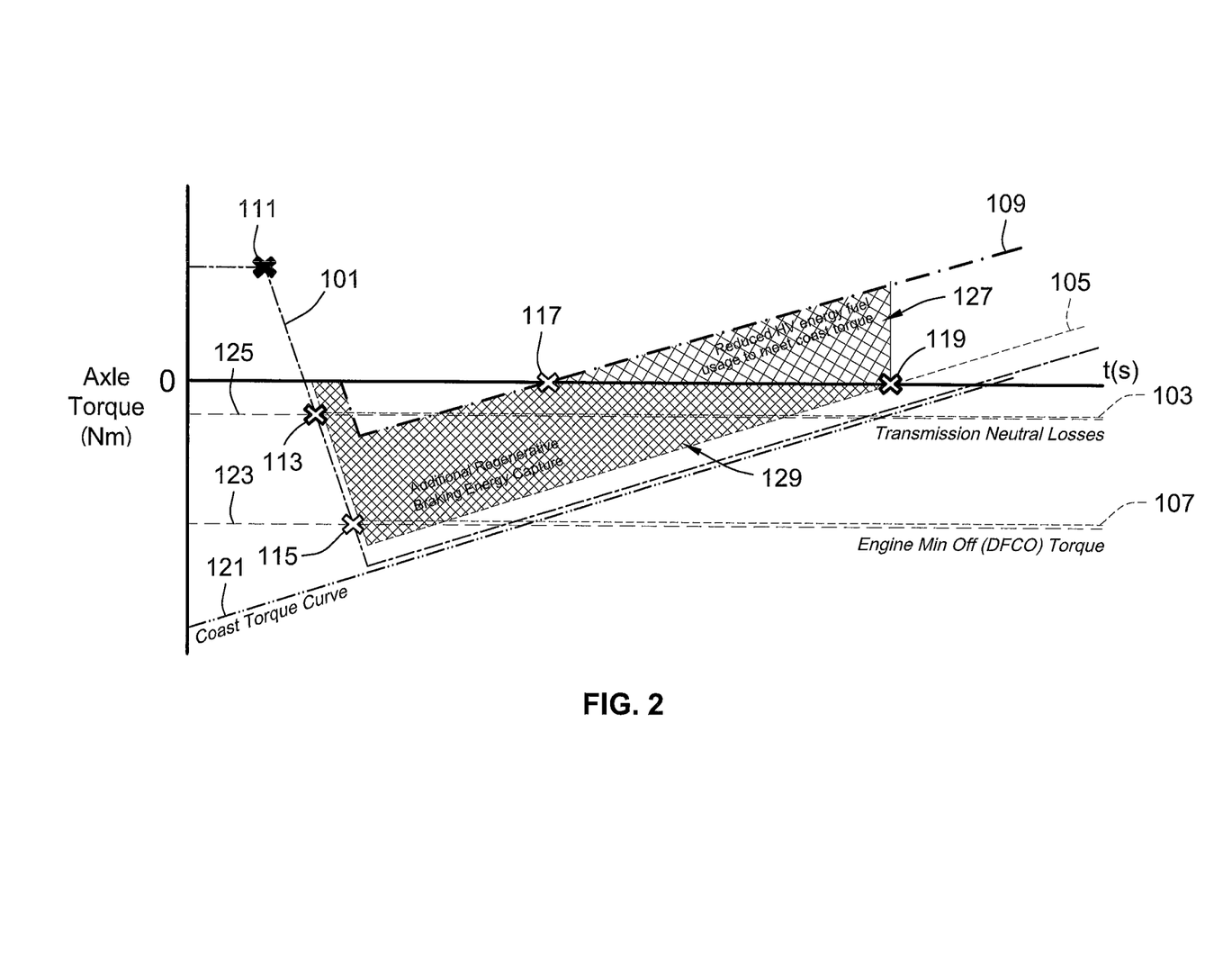
FIG. 2 is a graph of axle torque (Nm) vs. time (s) for a representative P4 HEV powertrain illustrating increased regenerative braking production through implementation of a regenerative braking protocol in accord with aspects of the disclosed concepts.

FIG. 2 graphically illustrates an axle torque curve, with torque axle torque (Nm) on the y-axis versus time (seconds) on the x-axis, for a representative P4 HEV powertrain illustrating increased regenerative braking production through implementation of a disclosed regen control operation. In this graph, total driver-requested torque is shown at 101 along with primary axle torque (regen feature ON) shown at 103, secondary axle torque (regen feature ON) shown at 105, primary axle torque (regen feature OFF) shown at 107, and secondary axle torque (regen feature OFF) shown at 109. Driver accelerator pedal release ("tip-out") is onset at a first point in time (t(1)) 111, whereas regen capture (regen feature ON) begins at a latter second point in time (t(2)) 113, regen capture (regen feature OFF) begins and engine DFCO activates at a third point in time (t(3)) 115, MGU discharges and/or engine starts (regen feature OFF) at a fourth point in time (t(4)) 117, and MGU discharges and/or engine adds additional torque (regen feature ON) at a fifth point in time (t(5)) 119. Also illustrated in the graph of FIG. 2 are a powertrain coast torque plot 121, a minimum engine (OFF with DFCO) torque plot 123, and a transmission (neutral) torque-losses plot 125.

Various attendant benefits to at least some of the disclosed regen techniques can be gleaned from data presented in FIG. 2. For instance, the additional electrical energy that may be produced through implementation of disclosed regen control operations is highlighted in region 129 of FIG. 2, while reduced high-voltage energy and/or fuel usage to meet coast torque is highlighted in region 127. Another attendant benefit may include the HEV's secondary axle being engaged earlier with the regen control feature active. This may be achieved by disabling DFCO and decelerating the vehicle with MGU-generated brake torque applied to the secondary axle. In comparison, the powertrain normally needs to wait until the driver's torque request is below the engine DFCO torque with the regen control feature deactivated. Traversing the total driver-requested torque plot 101 after driver tip-out 111 down the "creep-coast curve", starting regen capture at t(2) 113 where the plot 101 crosses the transmission neutral loss line 125, rather than at t(3) 115 where it crosses the DFCO torque 123 line, allows the HEV powertrain to capture additional energy for a longer period of time (e.g., region 129). Furthermore, without the regen control feature activated, the HEV powertrain may normally need to either discharge the RESS to provide motive torque or utilize engine torque; further energy savings are realized through implementation of the regen control feature (e.g., region 127).

Figure 3:
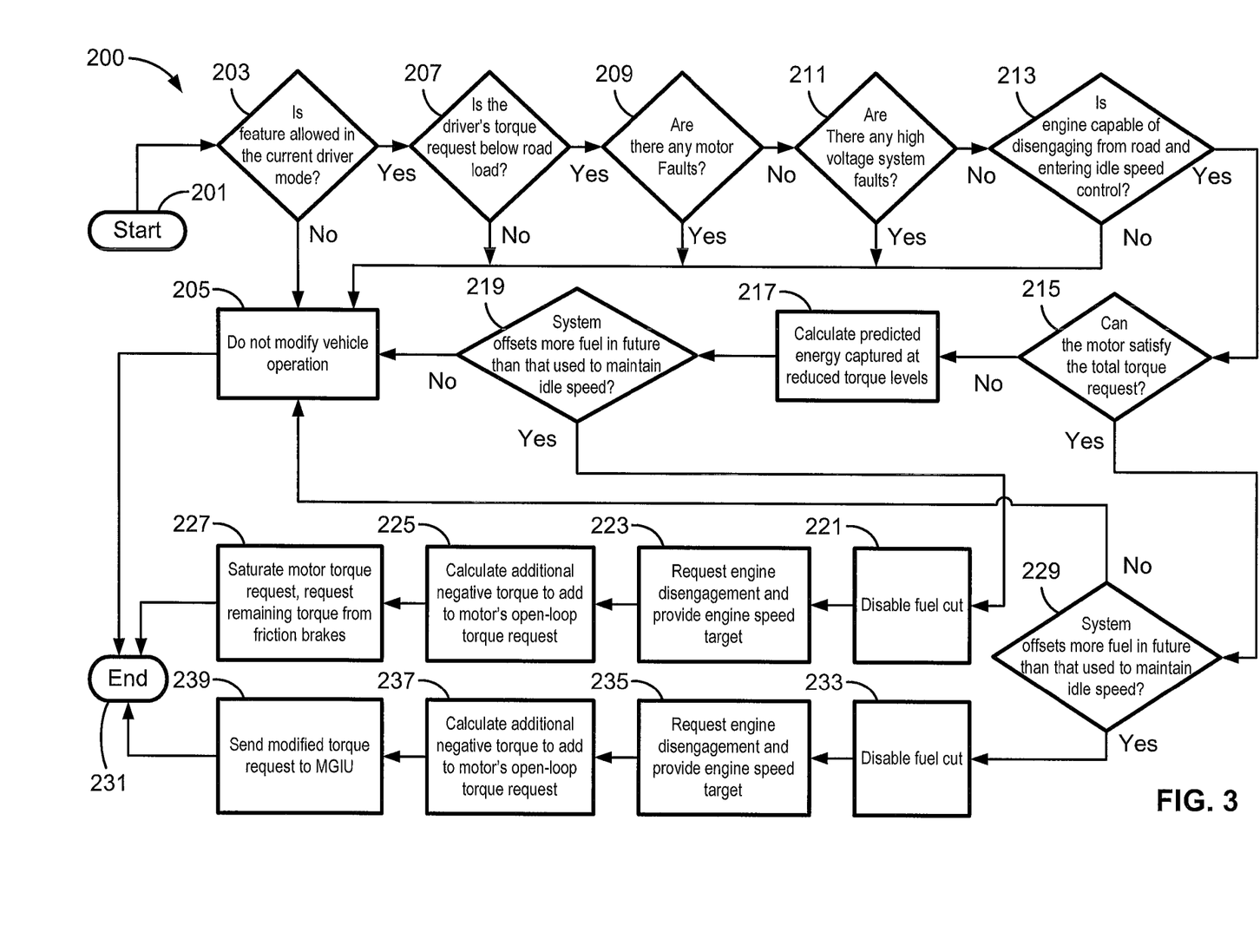
FIG. 3 is a flowchart illustrating a representative regenerative braking control protocol for a hybrid electric vehicle, which may correspond to memory-stored instructions executed by an onboard or remote controller, control-logic circuit, programmable control unit, or other integrated circuit (IC) device or network of devices in accord with aspects of the disclosed concepts.

With reference next to the flow chart of FIG. 3, an improved method or control strategy for operating an electrified powertrain system, such as the P4 HEV powertrain of FIG. 1, for increased regenerative braking performance is generally described at 200 in accordance with aspects of the present disclosure. Some or all of the operations illustrated in FIG. 3, and described in further detail below, may be representative of an algorithm that corresponds to processor-executable instructions that may be stored, for example, in main or auxiliary or remote memory, and executed, for example, by an electronic controller, processing unit, control logic circuit, or other module or device or network of modules/devices, to perform any or all of the above and below described functions associated with the disclosed concepts. It should be recognized that the order of execution of the illustrated operation blocks may be changed, additional operation blocks may be added, and some of the described operations may be modified, combined, or eliminated.

Method 200 of FIG. 3 begins at terminal block 201 with memory-stored, processor-executable instructions for a programmable controller or control module or similarly suitable processor to call up an initialization procedure for a supplementary energy capture protocol. This routine may be executed in real-time, continuously, systematically, sporadically, responsively, and/or at regular intervals, for example, each 100 milliseconds during normal operation of the motor vehicle 10. As yet another option, terminal block 201 may initialize responsive to a user command prompt, resident controller command prompt, or a broadcast prompt signal received from an "off-board" centralized host system or cloud computing service. Upon completion of the control operations presented in FIG. 3, the method 200 may advance to terminal block 231 and temporarily terminate or may loop back to terminal block 201 and run in a continuous loop.

Advancing from terminal block 201 to decision block 203, the method 200 ascertains whether or not a current operating mode of the vehicle prevents activation of the supplementary energy capture protocol. Some non-limiting examples of vehicle operating modes that may be preprogrammed to block the protocol include driver-selectable performance modes, such as Touring, Sport, etc. Other representative examples include platform-specific operating modes and system-selected modes, including during activated electronic stability control (ESC) or advanced collision avoidance (ACA). If the supplementary energy capture protocol is not allowed in the current vehicle operating mode (block 203=NO), method 200 advances to process block 205 and does not modify vehicle operation. In this instance, the supplementary energy capture protocol may be deactivated and, optionally, a default regenerative braking operation may be activated. The method 200 thereafter advances to terminal block 231 and provisionally terminates.

Upon determining that the current operating mode of the vehicle does not prevent activation of the supplementary energy capture protocol (block 203=YES), method 200 executes decision block 207 to assess whether or not a driver-selected or controller-commanded powertrain torque request is less than a present road load on the HEV. As mentioned above, powertrain torque request may be less than the road load during a braking event, a tip-out event, a downhill traverse, etc. If the torque request is at or above the road load (block 207=NO), method 200 proceeds to process blocks 205 and 231 of FIG. 3 as described above.

Responsive to a determination that the torque request is below the road load (block 207=YES), the method 200 carries out processor-executable instructions to determine: (1) are there any motor faults that preclude the supplementary energy capture protocol (decision block 209); (2) are there any HV system faults that prevent the supplementary energy capture protocol (decision block 211); and (3) are there any powertrain faults that inhibit the supplementary energy capture protocol (decision block 213). Decision block 209 may output a positive result upon receipt of a motor fault signal indicative of a motor fault that prevents operating the traction motor to carry out any of the subsequent motor functions in FIG. 3. Likewise, decision block 211 may output a positive result upon receipt of a system fault signal indicative of a fault in the HV system that prevents operating the traction motor or battery pack from carrying out any of the corresponding functions in FIG. 3. Non-limiting examples of applicable motor and HV system faults include motor and TPIM faults, such as a CAN communication error, power electronics failure, motor position sensor failure, rotor/stator temperature error, etc. Additional examples include RESS faults, such as a RESS CAN communication error, contactor stuck open/closed fault, cell/module/pack voltage and/or sensor error, etc. If either a motor fault or an HV electrical system fault exists (block 209=YES and/or block 211=YES), method 200 proceeds to blocks 205 and 231 as described above.

Contemporaneous with verifying that there are no related motor and no related HV system faults (block 209=NO && block 211=NO), the method 200 attempts to confirm that the engine is capable of drivingly disengaging from the vehicle's road wheels and entering into target speed control at decision block 213. Decision block 213 may return a positive result upon receipt of a powertrain fault signal indicative of a fault in the powertrain system that prevents the engine from operating at the predefined target engine speed and/or being disconnected from the road wheels. Non-limiting examples of applicable powertrain system faults include a PCM CAN communication error, an intrusive diagnostics fault (e.g., Catalyst Light-Off, Post-catalyst Oxygen sensor Performance Diagnostic (POPD), Evap, Purge, etc.), a reduced engine power error, an engine coolant/oil temperature low/high error, etc. These example faults may prevent the engine from performing as set forth in FIGS. 3A and 3B; running related diagnostic tests to monitor for potential faults may also prevent one or more of the described features. If the engine cannot disengage and/or cannot enter into target speed control (block 213=NO), method 200 proceeds to blocks 205 and 231 as described above.

After the system confirms that there are no aberrations or impediments in the traction motor, HV electrical system, or powertrain, method 200 advances to decision block 215 to determine whether or not the traction motor can satisfy a total braking torque request anticipated for the supplementary energy capture protocol. To carry out this analysis, the ECU 34 of FIG. 1 may retrieve, e.g., from cache memory or lookup table, an engine-calibrated drag torque specific to the ICE assembly 12. This torque value is arithmetically summed with a regen torque request output by the HEV's electronic brake control module; the aggregate value is then compared to a real-time or estimated motor torque limit of the traction motor 36 at current vehicle operating conditions. A "coast regen" (off throttle and off brake decel) torque request and a "brake regen" (on brake decel) torque request may be predefined and stored in existing logic. Estimated motor torque limits and engine drag torques may be calibrated to each prime mover under controlled testing conditions and stored in respective lookup tables retrievable by the ECU.

A determination that the traction motor cannot satisfy the total braking torque request for carrying out the supplementary energy capture protocol (block 215=NO) may cause the method 200 to automatically execute memory-stored logic in process block 217 to calculate a predicted total energy that may be captured at reduced torque levels. Continuing with the discussion of HEV 10 of FIG. 1 as a non-limiting example, ECU 34 may be programmed to estimate how much regen energy the P4 powertrain is able to recover at the motor torque limit derived at block 215. This estimation may be performed by first calculating an estimated motor power for a predicted motor speed associated with the reduced torque levels, and subsequently estimating how much of this estimated motor power will be recovered into the traction battery pack 42 across a defined window of time.

With continuing reference to FIG. 3, the method 200 continues from process block 217 to decision block 219 to assess whether or not the HEV powertrain system is able to offset more fuel usage during future use of the vehicle than the fuel used to maintain engine idle speed for the supplementary energy capture protocol. Using the predicted total energy identified in the preceding step, ECU 34 may be programmed to estimate how much of this energy is usable by the traction motor 36 at a later point in time, e.g., taking into account expected losses to recover the energy and expected losses to use the energy to provide positive power from the motor to offset engine fuel. This final total captured energy value is then converted to a fuel energy offset value using a predefined equivalence factor. As part of the inquiry of decision block 219, the ECU 34 may compare how much fuel will be consumed by keeping the engine on while disconnected from the vehicle's road wheels versus a default regen protocol that keeps the engine connected to the wheels and activates DFCO during a deceleration event. This analysis may be performed "offline" by, for example, preset calibrations that utilize specified inputs, such as vehicle speed, brake input, and sensor signals, or may be performed "online" by, for example, a resident processor executing a memory-stored algorithm that calculates fuel usage specific to a given operating scenario of the vehicle. If the energy captured by the supplementary energy capture protocol will not offset the engine fuel used for the protocol (block 219=NO), method 200 proceeds to block 205 then block 231 as described above.

Responsive to a determination that the supplementary energy capture protocol will in fact offset more fuel in future use of the engine than the fuel used to maintain idle/target engine speeds (block 219=YES), method 200 disables DFCO at process block 221 and, once disabled, requests the engine be disengaged from the road wheels and maintained at a target engine speed at process block 223. As mentioned above, the target engine speed may be a static "idle" speed or an actively changing "dynamic" engine speed. Target engine speed may be defined by matching a real-time engine speed during regen with a real-time transmission output speed received from PCM. For such a dynamic engine speed, the engine speed may follow a saw-tooth engine speed profile that occurs during a normal deceleration event as the transmission sequentially downshifts. Alternatively, the engine speed may be set to a target idle speed that may be retrieved from memory via the engine control module. A third option includes setting the engine speed to a predefined (non-idling) engine speed that is specific to the supplementary energy capture protocol and is calculated by the ECM. It is envisioned that the target engine speed may be a combination of the above-described approaches, an offset of one or more of the above-described approaches, or another uniquely calculated speed target.

Method 200 of FIG. 3 proceeds to process block 225 and calculates additional negative torque to add to the traction motor's open-loop torque request. During a deceleration event, a negative torque request is sent to the traction motor, such as a "coast regen" torque request or a "brake regen" torque request, for both the supplementary energy capture protocol and the default regen protocol. When implementing the supplementary energy capture protocol, however, the method 200 increases the braking torque output by the traction motor, i.e., by adding supplementary negative torque to the existing coast/brake regen torque request to offset engine drag torque lost by drivingly disconnecting the engine from the vehicle wheels. This additional negative motor torque may be derived by converting an estimated engine drag torque at current vehicle operating conditions to a motor torque offset value. This may include all requisite transmission gear changes in addition to the internal engine friction losses.

Continuing from process block 225 to process block 227, the method 200 saturates the motor torque request and, if necessary to ensure a desired vehicle deceleration rate, requests additional braking torque be provided by the vehicle's brake system. Process block 227 may include the ECU 34 operating the traction motor 36 at a maximum negative torque capacity. If this maximum negative torque capacity is deemed insufficient to achieve desired deceleration rates, the vehicle employs friction-type braking on an as-needed bases to increase the vehicle's total rate of deceleration.

Returning to the discussion of decision block 215, method 200 may respond to a determination that the traction motor can in fact satisfy the total braking torque request for carrying out the supplementary energy capture protocol (block 215=YES) by ascertaining whether or not the HEV powertrain system is able to offset more fuel usage during future use of the vehicle than the fuel used to maintain engine idle speed for the supplementary energy capture protocol, as indicated at decision block 229. Decision blocks 219 and 229 are analogous inquiries, with the latter foregoing the calculation conducted at process block 217 and instead using a predicted total energy that may be captured at desired motor torque levels. If the energy captured by the supplementary energy capture protocol will not offset the engine fuel used for the protocol (block 229=NO), method 200 proceeds to block 205 then block 231 as described above.

Responsive to a determination that the supplementary energy capture protocol will in fact offset more fuel in future use of the engine than the fuel used to maintain idle/target engine speeds (block 229=YES), method 200 disables fuel cutoff at process block 233, and contemporaneously disengages the engine from the road wheels while commanding engine speed to maintain a target engine speed at process block 235. Method 200 continues to process block 237 and calculates additional negative torque to add to the traction motor's open-loop torque request, similar to process block 225. At process block 239, a modified motor torque request is output to the traction motor.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, solid-state memory, a hard drive, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a hybrid electric vehicle (HEV), the HEV including a vehicle body, multiple road wheels, and an HEV powertrain, the HEV powertrain including a traction motor and an engine operable to drive the road wheels to thereby propel the HEV, and a power transmission selectively drivingly connecting the engine to one or more of the road wheels, the method comprising:
    determining, via a vehicle controller, if an operating state or fault of the HEV prevents engagement of a regenerative braking (regen) control operation;
    determining, via the vehicle controller responsive to the operating state or fault not preventing engagement of the regen control operation, if a torque request for the HEV powertrain is less than a road load on the HEV; and
    executing the regen control operation responsive to the torque request being less than the road load, the regen control operation including:
        controlling the power transmission to drivingly disconnect the engine from the one or more of the road wheels;
        controlling the engine to operate at a predefined target engine speed while disconnected from the one or more of the road wheels;
        calculating a negative torque offset to maintain a predetermined vehicle deceleration rate after disconnecting the engine from the road wheels; and
        controlling the traction motor to output a negative motor torque based on the calculated negative torque offset.

2. The method of claim 1, wherein a fuel system of the HEV is operable to fuel the engine and to execute a deceleration fuel cutoff (DFCO) feature temporarily suspending fuel flow to the engine during forward driving of the HEV, the method further comprising deactivating the DFCO feature prior to drivingly disconnecting the engine from the road wheels.

3. The method of claim 1, further comprising determining if the traction motor is capable of generating at least the calculated negative torque offset, wherein the traction motor is controlled to output the negative motor torque in response to determining that the traction motor is capable of generating at least the calculated negative torque offset.

4. The method of claim 3, further comprising, responsive to determining that the traction motor is not capable of generating at least the calculated negative torque offset:
    determining a fuel energy penalty for operating the engine at the predefined target engine speed for the regen control operation;
    determining a maximum negative motor torque, less than the calculated negative torque offset, the traction motor is capable of generating;
    estimating a total electrical energy captured by the regen control operation with the output negative motor torque based on the maximum negative motor torque;
    determining if the total electrical energy is greater than the fuel energy penalty; and
    executing, in response to the estimated total electrical energy being greater than the fuel energy penalty, the regen control operation with the traction motor controlled to output the negative motor torque based on the maximum negative motor torque.

5. The method of claim 4, further comprising executing, responsive to the estimated total electrical energy not being greater than the fuel energy penalty, a default regen control operation without drivingly disconnecting the engine from the road wheels and without operating the engine at the predefined target engine speed.

6. The method of claim 3, further comprising, responsive to determining that the traction motor is capable of generating at least the calculated negative torque offset:
    determining a fuel energy penalty for operating the engine at the predefined target engine speed for the regen control operation;
    estimating a total electrical energy captured by the regen control operation; and
    determining if the estimated total electrical energy captured by the regen control operation is greater than the fuel energy penalty,
    wherein executing the regen control operation is further in response to the estimated total electrical energy being greater than the fuel energy penalty.

7. The method of claim 6, further comprising executing, responsive to the total electrical energy not being greater than the fuel energy penalty, a default regen control operation without drivingly disconnecting the engine from the road wheels and without operating the engine at the predefined target engine speed.

8. The method of claim 1, further comprising:
    determining a total negative torque request associated with a deceleration event for the HEV powertrain to maintain the predetermined vehicle deceleration rate; and
    calculating a supplemental negative torque offset for the traction motor to maintain the predetermined vehicle deceleration rate based on the total negative torque request,
    wherein the negative motor torque output by the traction motor is further based on the calculated supplemental negative torque offset.

9. The method of claim 1, wherein determining if the operating state or fault prevents engagement of the regen control operation includes receiving a driver-selected operating mode for the HEV that disengages the regen control operation.

10. The method of claim 1, wherein determining if the operating state or fault prevents engagement of the regen control operation includes receiving a motor fault signal indicative of a motor fault of the traction motor that prevents engagement of the regen control operation.

11. The method of claim 1, wherein determining if the operating state or fault prevents engagement of the regen control operation includes receiving a system fault signal indicative of a system fault in a high-voltage (HV) electrical system of the HEV that prevents engagement of the regen control operation.

12. The method of claim 1, wherein determining if the operating state or fault prevents engagement of the regen control operation includes receiving a powertrain fault signal indicative of a powertrain system fault that prevents the engine from operating at the predefined target engine speed and/or being disconnected from the road wheels.

13. The method of claim 1, wherein the HEV further includes first and second axles bearing first and second pairs of the road wheels, respectively, the engine being operable to drive the first pair of the road wheels, and the traction motor being operable to drive the second pair of the road wheels, and wherein the power transmission drivingly disconnects the engine from the first axle, and the traction motor outputs the negative motor torque to the second axle.

14. A hybrid electric vehicle (HEV) comprising:
a vehicle body with a first axle bearing a first set of road wheels and a second axle bearing a second set of road wheels;
an HEV powertrain including an internal combustion engine (ICE) assembly mounted on the vehicle body and operable to output torque to the first set of road wheels to propel the HEV, a traction motor mounted on the vehicle body and operable to output torque to the second set of road wheels to propel the HEV, and a power transmission mounted on the vehicle body and operable to selectively drivingly connect the ICE assembly to the first axle; and
a vehicle controller programmed to:
determine if an operating state or fault of the HEV prevents engagement of a regenerative braking (regen) control operation;
responsive to the operating state or fault not preventing engagement of the regen control operation, determine if a torque request for the REV powertrain is less than a road load on the HEV; and
responsive to the torque request being less than the road load, execute the regen control operation, including:
control the power transmission to drivingly disconnect the engine from the first set of road wheels;
control the engine to operate at a predefined target engine speed while disconnected from the first set of road wheels;
calculate a negative torque offset to maintain a predetermined vehicle deceleration rate after disconnecting the engine from the first set of road wheels; and
control the traction motor to output a negative motor torque to the second set of road wheels based on the calculated negative torque offset.

15. The HEV of claim 14, further comprising a fuel system operable to fuel the engine and to execute a deceleration fuel cutoff (DFCO) feature temporarily suspending fuel flow to the engine during forward driving of the HEV, the regen control operation further comprising deactivating the DFCO feature prior to drivingly disconnecting the engine from the road wheels.

16. The HEV of claim 14, wherein the vehicle controller is further programmed to determine if the traction motor is capable of generating the calculated negative torque offset, wherein the traction motor is controlled to output the negative motor torque in response to determining that the traction motor is capable of generating the calculated negative torque offset.

17. The HEV of claim 16, wherein the vehicle controller is further programmed to:
determine a fuel energy penalty for operating the engine at the predefined target engine speed for the regen control operation;
determine a maximum negative motor torque, less than the calculated negative torque offset, the traction motor is capable of generating;
estimate a total electrical energy captured by the regen control operation with the output negative motor torque based on the maximum negative motor torque;
determine if the total electrical energy is greater than the fuel energy penalty; and
execute, in response to the estimated total electrical energy being greater than the fuel energy penalty, the regen control operation with the traction motor controlled to output the negative motor torque based on the maximum negative motor torque.

18. The HEV of claim 16, wherein the vehicle controller is further programmed to:
determine a fuel energy penalty for operating the engine at the predefined target engine speed for the regen control operation;
estimate a total electrical energy captured by the regen control operation; and
determine if the estimated total electrical energy captured by the regen control operation is greater than the fuel energy penalty,
wherein executing the regen control operation is further in response to the estimated total electrical energy being greater than the fuel energy penalty.

19. The HEV of claim 18, wherein the vehicle controller is further programmed to execute, responsive to the total electrical energy not being greater than the fuel energy penalty, a default regen control operation without drivingly disconnecting the engine from the road wheels and without operating the engine at the predefined target engine speed.

20. The HEV of claim 14, wherein the vehicle controller is further programmed to:
determine a total negative torque request associated with a deceleration event for the HEV powertrain to maintain the predetermined vehicle deceleration rate; and
calculate a supplemental negative torque offset for the traction motor to maintain the predetermined vehicle deceleration rate based on the total negative torque request,
wherein the negative motor torque output by the traction motor is further based on the calculated supplemental negative torque offset.

* * * * *